(No Model.)

A. B. UPHAM.
ROAD MAP.

No. 582,836. Patented May 18, 1897.

Witnesses:
Bertha L. Anderson.
Wm. H. Baker.

Inventor,
Artemas B. Upham

United States Patent Office.

ARTEMAS B. UPHAM, OF BOSTON, MASSACHUSETTS.

ROAD-MAP.

SPECIFICATION forming part of Letters Patent No. 582,836, dated May 18, 1897.

Application filed July 6, 1896. Serial No. 598,266. (No model.)

*To all whom it may concern:*

Be it known that I, ARTEMAS B. UPHAM, a citizen of the United States, and a resident of Boston, county of Suffolk, Commonwealth of Massachusetts, have invented an Improved Road-Map, of which the following is a specification.

Every bicycle-rider is familiar with the inconvenience and delay occasioned when attempting to follow a route laid out on an ordinary road-map. Each time he wishes to consult the map he must dismount, take it from his pocket, carefully unfold it, vainly endeavor to protect it from the wind, study it awhile, and then refold, return to his pocket, remount, and ride a few blocks until another consultation requires a repetition of the vexatious program.

My invention is designed to remedy all this; and it consists, essentially, of an elongated map affixed to rollers mounted in friction-tight bearings. This can be made of a convenient size to slip into the pocket, being removed with one hand while guiding the bicycle with the other, consulted, and returned. As a further improvement, however, I design the roller-bearings for convenient attachment to the handle-bars, where the map is in constant sight of the rider and can be more easily manipulated by a rotation of the rollers to bring fresh portions of the map in view.

Figure 1:
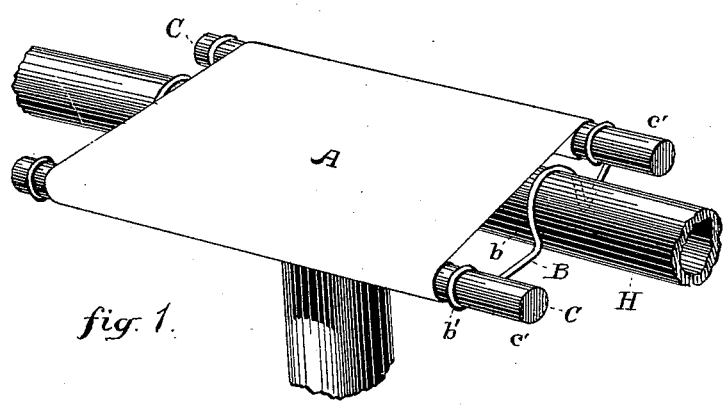
Figure 2:
Figure 3:
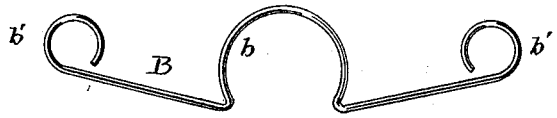
Figure 4:

Referring to the drawings forming part of this specification, Figure 1 is a perspective view of my road-map shown as attached to a bicycle. Fig. 2 is a view of one of the rollers; Fig. 3, of one of the bearing-frames, and Fig. 4 a view of a bearing-frame unadapted for attachment to a bicycle.

As shown in Fig. 1, A indicates the map, printed upon bond-paper in its usual commercial state or upon some form of paper or fabric rendered impervious to water in order to render the same immune from injury in wet weather. The ends of this map are gummed or otherwise affixed to the rollers C and wound thereon until in a state or comparative tension. Said rollers are formed with annular grooves $c$ for the reception of the bearings and have one or more projecting ends $c'$, by which to turn them.

The bearing-frames are formed of wire B, having their ends bent into nearly complete circles $b'$ about equal in inside diameter to the rollers C. In the form shown in Fig. 4 the frame part B runs in a straight line from bearing to bearing $b'$. This construction is for those who wish a road-map to slip into their pockets instead of attaching to a bicycle.

For attaching the arrangement to a wheel the central part of each frame B is formed with the horseshoe grip $b$, adapted by its resilience to be sprung apart until it clasps the handle-bar H of a bicycle and holds itself tightly in position.

In the manufacture of this road-map the frames B and rollers C are made as shown and then the rollers inserted into the bearings $c'$. A light blow or two upon said bearings contracts them into the grooves $c$ until the rollers are held moderately friction-tight. The map, or several of them attached end to end, is then terminally fixed to the rollers and the whole ready for use.

When guided by this road-map, the wheelman has it constantly before his eyes, and when he has ridden to the extent of territory in view upon it turns the rollers until a fresh section is in sight. In doing this there is no need for dismounting, as he can easily manipulate it with one hand while guiding the wheel with the other. When he reaches his trip's end, he simply reverses the road-map and retraces his journey in the same manner as at first.

What I claim as my invention, and desire to secure by Letters Patent, is as follows, to wit:

1. The combination of the elongated map, the rollers supporting the same and having annular grooves, $c$, and the wires, B, having their ends formed into bearings, $b'$, clasping said rollers in said grooves friction-tight, substantially as and for the purpose set forth.

2. The combination of the elongated map, the rollers supporting the same, bearings for said rollers, and means for attaching said bearings to the handle-bar of a bicycle, for the purpose set forth.

3. The combination of the map, the rollers, C, and the bearings, B, having the resilient grip, $b$, substantially as and for the purpose set forth.

4. The combination of the map, the rollers,

C, having annular grooves, $c$, and the resilient wire frames having bearings, $b'$, and grips, $b$, substantially as and for the purpose set forth.

5. In a bicycler's road-map, the combination of an elongated map, supports for the ends thereof adapted for keeping it taut and for bringing any portion thereof into view, and means for attaching said supports to the handle-bar of a bicycle, for the purpose set forth.

In testimony that I claim the foregoing invention I have hereunto set my hand and seal this 15th day of June, in the year 1896.

ARTEMAS B. UPHAM. [L. S.]

Witnesses:
 BERTHA L. ANDERSON,
 WM. H. BAKER.